United States Patent
Katano

(10) Patent No.: US 9,329,817 B2
(45) Date of Patent: May 3, 2016

(54) INFORMATION PROCESSING APPARATUS, INFORMATION PROCESSING METHOD, AND COMPUTER-READABLE STORAGE MEDIUM

(71) Applicant: CANON KABUSHIKI KAISHA, Tokyo (JP)

(72) Inventor: Kiyoshi Katano, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/565,831

(22) Filed: Dec. 10, 2014

(65) Prior Publication Data

US 2015/0193181 A1    Jul. 9, 2015

(30) Foreign Application Priority Data

Jan. 6, 2014    (JP) ................................. 2014-000649

(51) Int. Cl.
*G06F 3/12*    (2006.01)
(52) U.S. Cl.
CPC ............ *G06F 3/1238* (2013.01); *G06F 3/1222* (2013.01); *G06F 3/1267* (2013.01); *G06F 3/1288* (2013.01)
(58) Field of Classification Search
CPC ... G06F 3/1238; G06F 3/1268; G06F 3/1285; G06F 3/1288; G06F 3/1267; G06F 3/1222

USPC ........................................................ 358/1.15
See application file for complete search history.

(56) References Cited

U.S. PATENT DOCUMENTS

2009/0183262 A1 *    7/2009    Ueda et al. ....................... 726/26

FOREIGN PATENT DOCUMENTS

| JP | 2009-217335 A | 9/2009 | |
| JP | 2009217335 | * 9/2009 | .............. G06F 21/20 |

OTHER PUBLICATIONS

English machine translation of JP 2009-217335.*

* cited by examiner

*Primary Examiner* — Iriana Cruz
(74) *Attorney, Agent, or Firm* — Fitzpatrick, Cella, Harper & Scinto

(57) ABSTRACT

Device identification information for causing a device to execute a job, and owner information for specifying the owner of the device are stored in association with each other. When the state of the device satisfies a predetermined condition, a display apparatus is controlled to display a screen for prompting a user to input the owner information. When the stored owner information is not input in the displayed screen, the device identification information is invalidated. When the owner information has been input or when the state of the device does not satisfy the predetermined condition, the device is controlled to be able to execute the job in accordance with the stored device identification information.

20 Claims, 10 Drawing Sheets

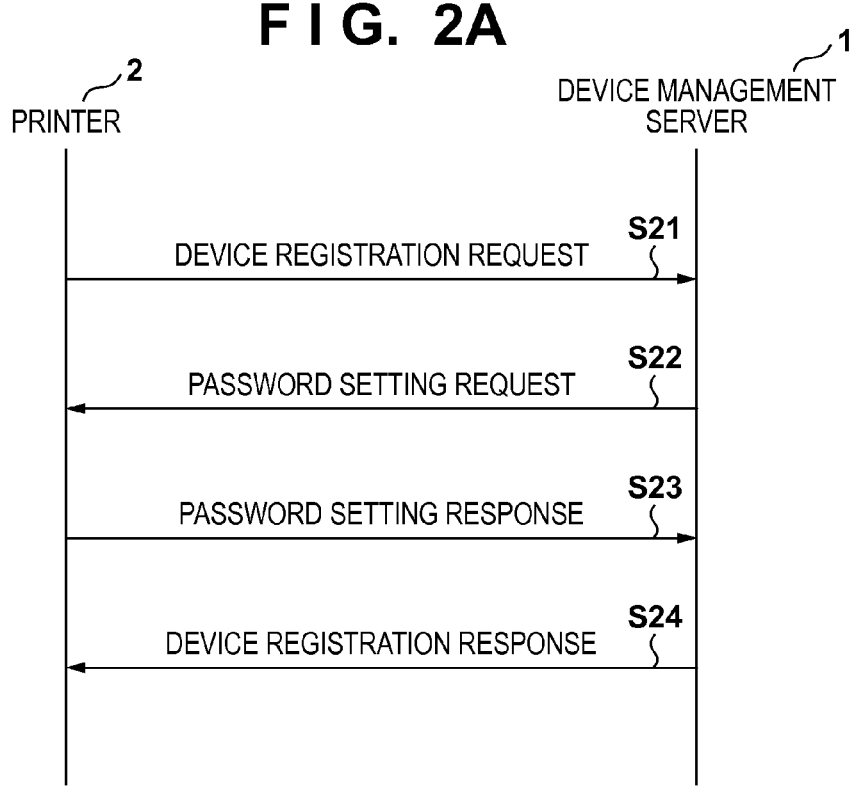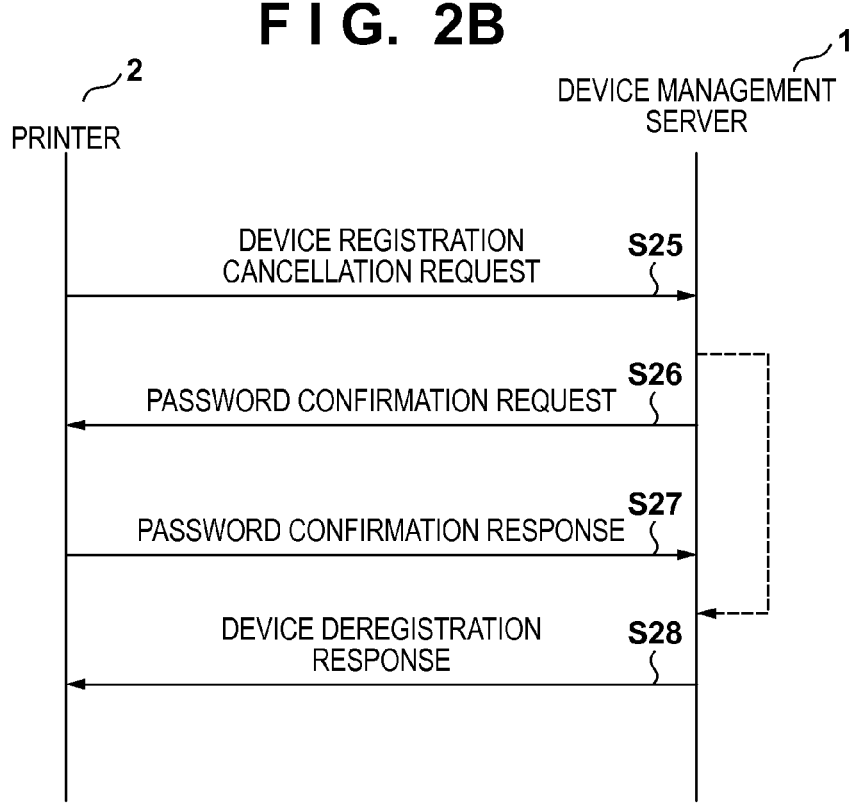

| DEVICE ID | PASSWORD | ~110 |
|---|---|---|
| Printer_id1 | Password1 | |
| Printer_id2 | Password2 | |
| Printer_id3 | Password3 | |
| Printer_id4 | Password4 | |
| Printer_id5 | Password5 | |

FIG. 11

| ENTRY ID | DEVICE ID |
|---|---|
| Entry_id1 | Printer_id1 |
| Entry_id2 | Printer_id2 |
| Entry_id3 | Printer_id3 |
| Entry_id4 | Printer_id4 |
| Entry_id5 | Printer_id5 |

| JOB ID | ENTRY ID | DEVICE ID | JOB DATA | JOB STATE |
|---|---|---|---|---|
| Job_id1 | Entry_id1 | Printer_id1 | Job_data1 | Job_state1 |
| Job_id2 | Entry_id2 | Printer_id2 | Job_data2 | Job_state2 |
| Job_id3 | Entry_id3 | Printer_id3 | Job_data3 | Job_state3 |
| Job_id4 | Entry_id4 | Printer_id4 | Job_data4 | Job_state4 |
| Job_id5 | Entry_id5 | Printer_id5 | Job_data5 | Job_state5 |

INFORMATION PROCESSING APPARATUS, INFORMATION PROCESSING METHOD, AND COMPUTER-READABLE STORAGE MEDIUM

BACKGROUND OF THE INVENTION

1. Field of the Invention

The present invention relates to an information processing technique of managing a device that executes a job.

2. Description of the Related Art

Conventionally, when a device linked to an owner is used from an Internet service, user identification information and device identification information are stored and managed in association with each other, and an identified user is permitted to use an identified device. For example, Japanese Patent Laid-Open No. 2009-217335 has disclosed a method of storing and managing, in association with each other, requesting device identification information for specifying a service requesting device, user identification information for specifying a user, and providing device identification information for specifying a service providing device.

In the related art, however, even if an owner changes by, for example, transferring an owned service providing device to another person in a state in which the linkage between the owner and the service providing device is valid, this relationship is maintained. For example, when a printer linked to and managed by an original owner before transfer is used from a portal site, the original owner may unintentionally output data to the printer of a new owner.

To cancel this relationship, the linkage relationship needs to be canceled explicitly. However, this may be difficult after the device has already been transferred to another person, and inconvenience is highly likely to occur.

SUMMARY OF THE INVENTION

The present invention provides an information processing technique capable of appropriately managing a device.

An information processing apparatus according to the present invention for achieving the above object comprises the following arrangement. That is, An information processing apparatus that manages a device configured to execute a job, comprising: a storage unit configured to store, in association with each other, device identification information for causing the device to execute the job, and owner information for specifying an owner of the device; a display control unit configured to, in a case where a state of the device satisfies a predetermined condition, control a display apparatus to display a screen for prompting a user to input the owner information; and a management unit configured to, in a case where the owner information stored in the storage unit is not input in the screen displayed by the display control unit, invalidate the device identification information, and in a case where the owner information has been input or in a case where the state of the device does not satisfy the predetermined condition, control the device to be able to execute the job in accordance with the device identification information stored in the storage unit.

According to the present invention, a device can be appropriately managed.

Further features of the present invention will become apparent from the following description of exemplary embodiments (with reference to the attached drawings).

BRIEF DESCRIPTION OF THE DRAWINGS

FIG. 2A is a sequence chart when performing device registration and device deregistration of a printer in a device management server;

FIG. 2B is a sequence chart when performing device registration and device deregistration of the printer in the device management server;

FIG. 11 is a table showing an example of an entry table; and

FIG. 12 is a table showing an example of a job table.

DESCRIPTION OF THE EMBODIMENTS

Embodiments of the present invention will now be described in detail with reference to the accompanying drawings.

<First Embodiment>

Figure 1A:
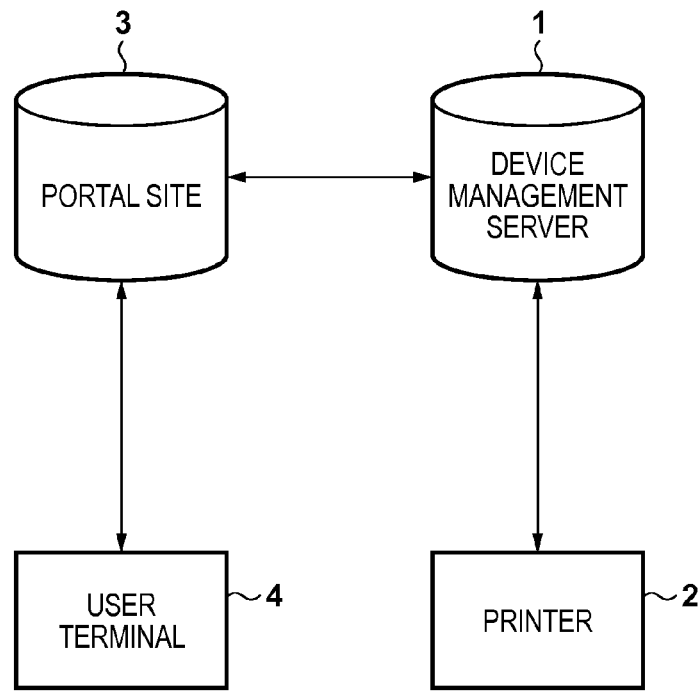
FIG. 1A is a block diagram showing a device management system according to the first embodiment.

FIG. 1A is a block diagram showing a device management system according to the first embodiment. In FIG. 1A, reference numeral 1 denotes a device management server; 2, a printer; 3, a portal site; and 4, a user terminal.

The device management server 1 is a server on a network (for example, Internet). The device management server 1 performs registration of a device to be managed that is specified by device-specific information, and management of the use of the device. Access to the device management server 1 is implemented by the HTTP protocol, and the device management server 1 operates as an HTTP server. In the first embodiment, a device ID (device identification information) uniquely assigned to each device by a device maker is used as the device-specific information. The device management server 1 stores a device ID in advance, and permits access from a device corresponding to the stored device ID. The device management server 1 permits access from the portal site 3 in order to specify a device ID and give a job to a device corresponding to the device ID. These accesses will be described later.

The printer 2 accesses the device management server 1 via the network, and operates as an HTTP client with respect to the device management server 1. As will be described later, the printer 2 registers it as a device in the device management server 1, and receives a job (for example, a print job) from the device management server 1 to print. In order to perform various operations between the printer 2 and the device management server 1, the printer 2 includes necessary building components such as a communication portion, an operation portion, a display portion, and a print mechanism portion.

The portal site 3 is a server that provides various services on the network, and can provide, for example, a print service to a user having a user account. The print service is provided by using the printer 2 registered in the device management server 1. The portal site 3 operates as an HTTP server with respect to the user terminal 4 and an HTTP client with respect to the device management server 1.

The user terminal 4 is a terminal apparatus for accessing the portal site 3 by a user having the user account of the portal site 3, and is an information processing apparatus such as a personal computer or portable terminal having a browser. The user terminal 4 operates as an HTTP client with respect to the portal site 3. Access to the portal site 3 by the user is performed through user authentication of the portal site 3. These processes are not described in detail here.

Figures 9, 10:
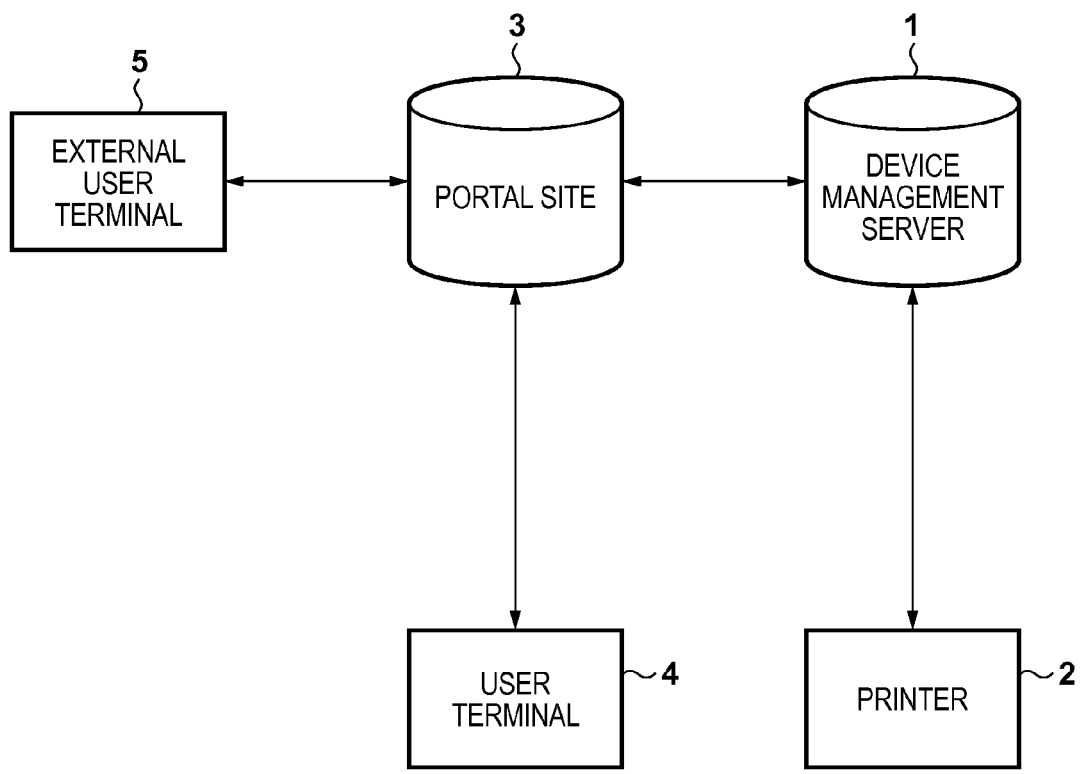
FIG. 9 is a block diagram showing a device management system according to the second embodiment.
FIG. 10 is a table showing an example of a device table.

The device management server 1 stores a device table 110 shown in FIG. 10, an entry table 111 shown in FIG. 11, and a job table 112 shown in FIG. 12. By using these tables, the device management server 1 manages device registration of the printer 2, the use of the printer 2 from the portal site 3, and a job.

The device table 110 is configured as column data that associates a device ID with a password. Especially, a case in which a printer is managed as a device will be exemplified. Data of one row is registration information of one printer.

The entry table 111 is configured as column data that associates an entry ID with a device ID. Data of one row serves as one entry and manages association between the user of the portal site 3 and a printer for use. The entry ID is assumed to be a unique value assigned to association between the user of the portal site 3 and a printer for use.

The job table 112 is configured as column data that associates a job ID, an entry ID, a device ID, job data, and a job state. Data of one row serves as registration information of one job. The job ID is used to assign a unique value to each job and specify the job. The job data represents the location of print data. The job state represents the state of a current job, and takes a value such as "waiting for processing", "during processing", "suspension", or "completion". Processes by the device management server 1 using these tables will be explained sequentially.

Figure 1B:
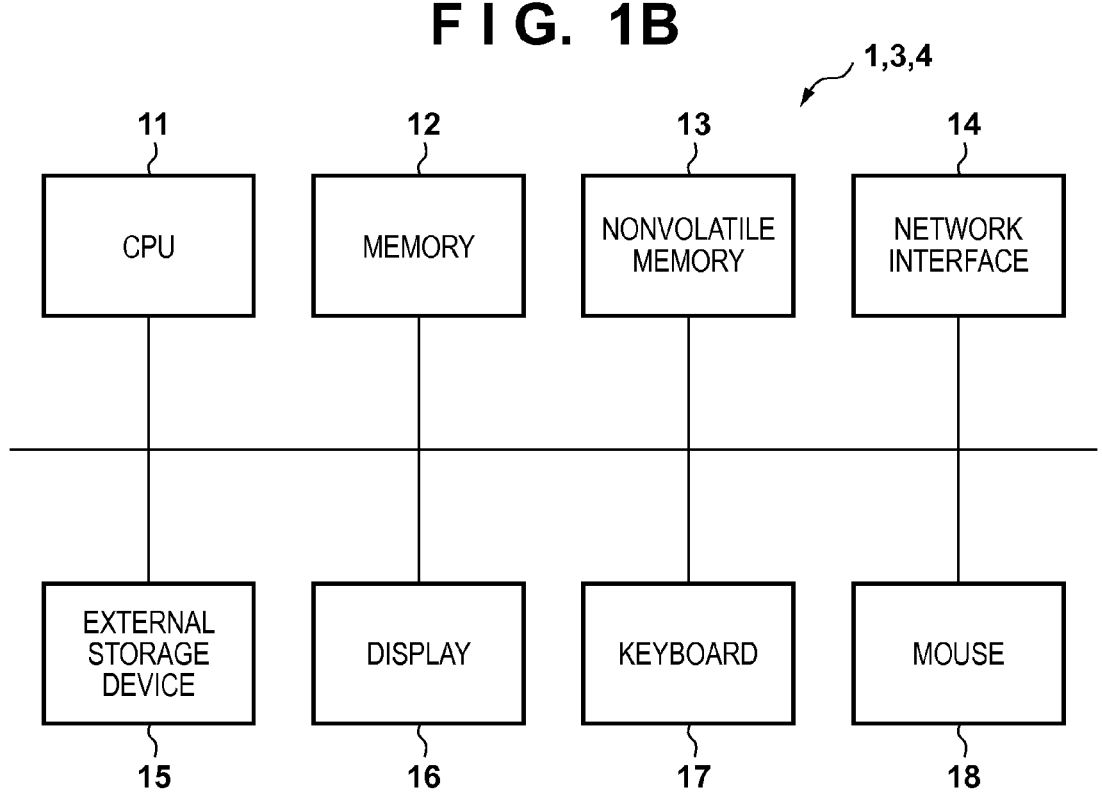
FIG. 1B is a block diagram showing the device management system according to the first embodiment.

Note that each of the device management server 1, the portal site 3, and the user terminal 4 includes, for example, a CPU 11, a memory 12 (for example, RAM), a nonvolatile memory 13 (hard disk or ROM), and a network interface 14 as standard building components mounted in a general-purpose computer, as shown in FIG. 1B. Each of the device management server 1, the portal site 3, and the user terminal 4 is connectable to an external storage device 15, a display 16, a keyboard 17, a mouse 18, and the like.

The nonvolatile memory 13 stores programs corresponding to various functions of the device management server 1, portal site 3, and user terminal 4. The CPU 11 executes these programs on the memory 12, implementing these functions. For example, a user instruction is input by operating an operation device such as the keyboard 17, the mouse 18, or the like, and the CPU 11 performs various control operations in accordance with the instruction. For example, the CPU 11 can perform display control on the display 16 serving as a display portion.

Similarly, the printer 2 also includes the CPU 11 for implementing the respective functions, the memory 12 (for example, RAM), the nonvolatile memory 13 (hard disk or ROM), the display 16, and the keyboard 17 and mouse 18 serving as input portions. The nonvolatile memory 13 stores programs corresponding to various functions of the printer 2. The CPU 11 executes these programs on the memory 12, implementing these functions. For example, a user instruction is input by operating the input portion, and the CPU 11 performs various control operations in accordance with the instruction. For example, the CPU 11 can perform display control on the display 16 serving as a display portion.

FIGS. 2A and 2B are sequence charts when performing device registration and device deregistration of the printer 2 in the device management server 1. FIG. 2A shows a device registration sequence. FIG. 2B shows a device deregistration sequence. Note that programs corresponding to processes shown in the sequences of FIGS. 2A and 2B are stored in the ROMs of the printer 2 and device management server 1. The CPUs of the printer 2 and device management server 1 execute the corresponding programs on the RAMs, thereby implementing the sequences shown in FIGS. 2A and 2B.

First, the device registration sequence will be described with reference to FIG. 2A.

In step S21, the printer 2 transmits a device registration request to the device management server 1. In this case, the device registration request is transmitted by accessing, for example, "http://manage.server.com/printer/register.cgi?id=printer_id" using a device ID specific to the printer 2. "manage.server.com" is the host name of the device management server 1, and "printer_id" is the device ID of the printer 2. In this embodiment, the printer 2 accesses a URL containing the device ID by an HTTP GET method, but the access is not limited to this method. The following description assumes that access from an HTTP client to an HTTP server is performed by the GET method, unless otherwise specified. The transmission of the device registration request starts in response to an operation to the operation portion of the printer 2.

If the printer 2 serving as a device registration requesting source has not been registered yet, the device management server 1 transmits a password setting request to the printer 2 in step S22. Upon receiving the password setting request, the printer 2 displays a password request screen on the display portion. Based on the password request screen displayed on the display portion, the user inputs a password via the operation portion. Although the password is input as information (owner information) that specifies an owner, the present invention is not limited to this. For example, it is also possible to store, in an IC card or the like, information that specifies an owner, and if necessary, mount the IC card in the printer 2 and confirm the owner. Alternatively, information capable of specifying a user, such as biological information of a user, is usable.

In step S23, the printer 2 transmits, to the device management server 1, a password setting response including the input password. In this case, the device management server 1 stores the password included in the response in the device table 110 in association with the device ID. That is, by this association in the device table 110, the device management server 1 links and manages the owner of the printer 2, the password that specifies the owner, and the device ID.

In step S24, the device management server 1 transmits a device registration response to the printer 2. Assume that the device registration response includes the URL of an access destination at which the printer 2 inquires regarding a job of the device management server 1. Subsequently, the printer 2 can access this URL and inquire regarding a job. This URL is assumed to be "http://manage.server.com/job/query.cgi?id=printer_id" here.

Next, the device deregistration sequence will be described with reference to FIG. 2B.

In step S25, the printer 2 transmits a device deregistration request to the device management server 1. In this case, the printer 2 accesses, for example, "http://manage.server.com/printer/delete.cgi?id=printer_id". Note that the transmission of the device deregistration request starts in response to an operation to the operation portion of the printer 2.

Upon receiving the device deregistration request from the printer 2, the device management server 1 switches the processing in accordance with the state of device management processing in FIG. 3 (to be described later). If the state of device management processing is a device registered state 32 (FIG. 3), the device management server 1 performs the response in step S26. If the state of device management processing is an intermediate state 33 (FIG. 3), the device management server 1 skips the processing in step S26 and performs the response in step S28. If the device "printer_id" has not been registered, that is, the state of device management processing is a device unregistered state 31 (FIG. 3), the device management server 1 performs an error response.

In step S26, the device management server 1 transmits a password confirmation request to the printer 2 in order to confirm whether the registered owner of the printer 2 has sent the device deregistration request, in order not to carelessly cancel the device registration. Upon receiving the password confirmation request, the printer 2 displays the password request screen on the display portion. The user inputs the password via the operation portion based on the password request screen displayed on the display portion.

In step S27, the printer 2 transmits, to the device management server 1, a password confirmation response including the input password. The device management server 1 confirms the password included in the password confirmation response, and if the password has been registered, cancels the device registration of the printer 2. More specifically, the device management server 1 searches the device table 110 by using the device ID of the printer 2 as a key, and collates the password of the detected registration information with the password included in the password confirmation response. If these passwords coincide with each other, the device management server 1 deletes the registration information from the device table 110. At this time, if the entry table 111 has an entry associated with this device ID, this entry is also deleted. If the job table 112 has an unprocessed job associated with this device ID, this job is also deleted.

In step S28, the device management server 1 transmits a device deregistration response to the printer 2. Accordingly, the printer 2 changes to the device unregistered state 31 (FIG. 3) in the device management processing of the device management server 1.

Figure 3:
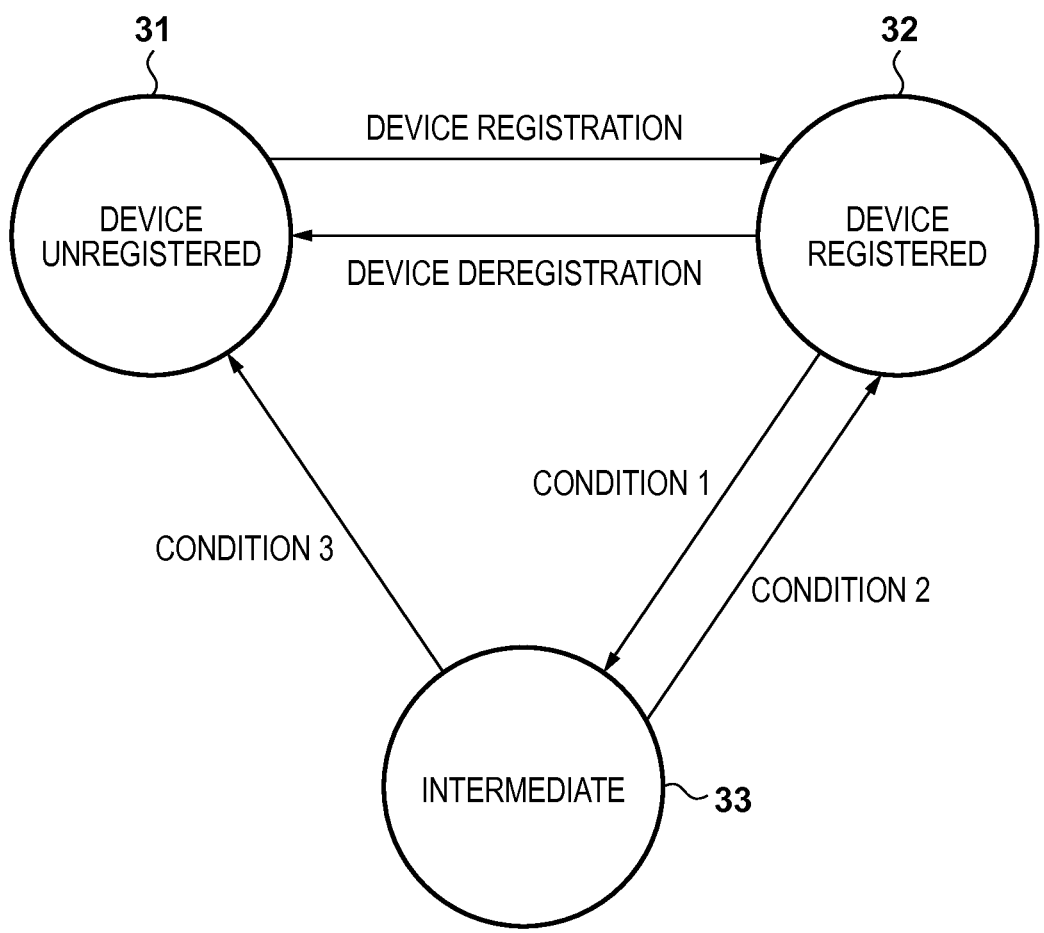
FIG. 3 is a view showing the state transition of device management processing in the device management server.

FIG. 3 is a view showing the state transition of the device management processing in the device management server 1.

State management of the device management processing in the device management server 1 is performed for every device ID. As shown in FIG. 3, management states are the device unregistered state 31, the device registered state 32, and the intermediate state 33.

As described above, when processing of device registration in the device management server 1 is performed in accordance with a request from the printer 2, a device management processing state corresponding to the device ID of the printer 2 shifts from the device unregistered state 31 to the device registered state 32. Similarly, when device deregistration processing is performed in accordance with a request from the printer 2, the device management processing state shifts from the device registered state 32 to the device unregistered state 31.

If a predetermined condition is satisfied while the device management processing is in the device registered state 32, the state shifts to the intermediate state 33. In the intermediate state 33, the linkage relationship between a managed device ID and an owner is indefinite, and owner confirmation is requested of a managed device.

For example, if a predetermined condition to determine that the owner of the printer 2 has changed is satisfied in the device registered state 32, the state changes to the intermediate state 33. Here, the condition (first condition) to shift from the device registered state 32 to the intermediate state 33 is a condition that no job inquiry has been received from the printer 2 upon the lapse of a predetermined period. However, the condition is not limited to this. For example, when a status notification that the status has changed from power-off to power-on has been received from the printer 2, the state may shift to the intermediate state 33.

In this manner, when the predetermined condition is satisfied, the state shifts to the intermediate state 33. For example, when the printer 2 is transferred, printing of a print job by a previous owner despite the intention of a current owner can be prevented.

In this embodiment, a print job is accepted from the user terminal 4 in accordance with a device ID registered in the device management server 1. Hence, when the printer 2 is transferred while the device ID remains registered in the device management server 1, the printer 2 may print an image based on a print job from the previous owner. Especially when the current owner after transfer does not recognize a password for invalidating the device ID, the device ID cannot be invalidated.

In this embodiment, therefore, when the predetermined condition to determine that the owner of the printer 2 has changed, like the first condition, is satisfied, the state changes to the intermediate state 33. In the intermediate state 33, the device registration in the device management server 1 can be invalidated without inputting a password, as described with reference to FIG. 2. Even if, for example, the printer 2 is transferred without performing device deregistration by the previous owner of the printer 2, the new owner can perform device deregistration without inputting a password. This can prevent, for example, execution of printing in accordance with a print job from the previous owner.

In this embodiment, if the linkage relationship with an owner is confirmed by owner confirmation as a condition (second condition) in the intermediate state 33, the state shifts to the device registered state 32. The owner confirmation is performed by inputting a password set at the time of device registration, but is not limited to this, as described above.

In a case in which the second condition is password input, for example, when the printer 2 is turned on, a screen for inputting a password is displayed on the display portion of the printer 2. A password input by the user, and the device ID are transmitted to the device management server 1. When the password and the device ID match those registered in the device table 110, the state shifts to the device registered state 32.

For example, even when the printer 2 is moved and turned off, and the state shifts to the intermediate state 33, the state can return to the device registered state 32. It can therefore be prevented to shift to the intermediate state 33 and invalidate the device ID without inputting a password though the owner of the printer 2 remains unchanged. By processing to be described later, it can be prevented to satisfy the third condition and automatically invalidate the device ID.

When no owner can be confirmed upon the lapse of a predetermined period (specified time) as a condition (third condition) in the intermediate state 33, the state shifts to the device unregistered state 31. In this case, for example, a password or a correct password has not been input in a predetermined period. When an incorrect password is input (incorrect input) a specified number of times or more, the state may shift to the device unregistered state 31 before the lapse of the predetermined period. As described above, even when the device deregistration processing is performed, the state shifts to the device unregistered state 31. After the shift to the device unregistered state 31, the device registration is deleted, and the information that specifies the owner is also deleted. That is, as in step S27 of FIG. 2, the device management server 1 deletes target data from the device table 110, the entry table 111, and the job table 112.

Figure 4:
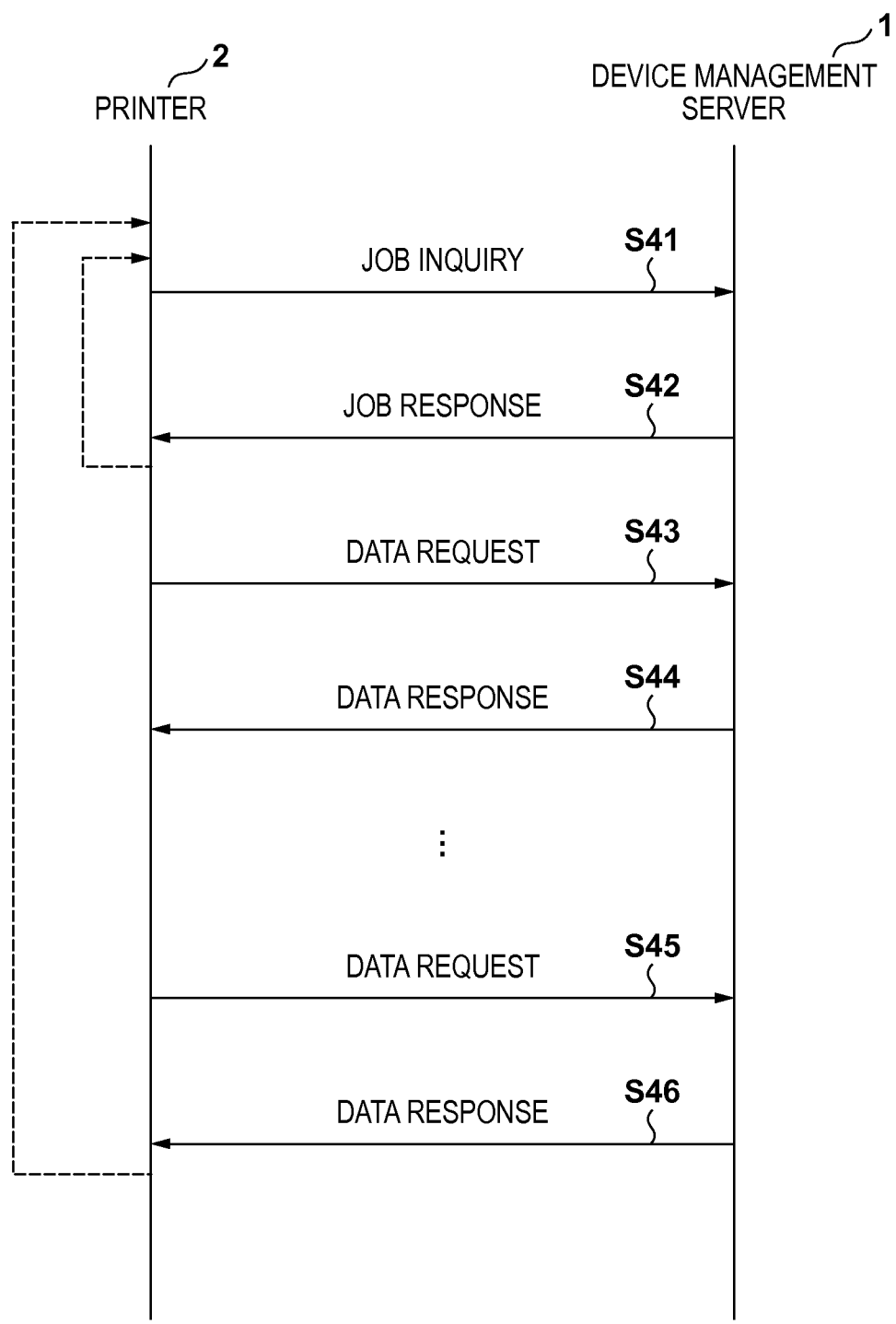
FIG. 4 is a sequence chart when the printer processes a job.

FIG. 4 is a sequence chart when the printer 2 processes a job. Note that programs corresponding to processing shown in the sequence of FIG. 4 are stored in the ROMs of the printer 2 and device management server 1. The CPUs of the printer 2 and device management server 1 execute the corresponding programs on the RAMs, thereby implementing the sequence shown in FIG. 4.

In step S41, the printer 2 transmits a job inquiry to the device management server 1. In this case, the transmission destination URL is "http://manage.server.com/job/query.cgi?id=printer_id" described above. Note that this job inquiry may include status information of the printer 2. The status information includes statuses such as "during printing?", the job ID of a print-completed job, the presence/absence of paper, and the presence/absence of ink. In this case, the transmission destination URL is described as, for example, "http://manage.server.com/job/query.cgi?id=printer_id&status=idle&job_complete=job_id&paper=empty". "job_complete=job_id" indicates the job ID of a print-completed job, and "paper=empty" indicates that paper has run out. The job inquiry in step S41 is periodically executed when the printer 2 is ON.

In step S42, the device management server 1 transmits a job response to the printer 2. In this case, if the device management state of the printer 2 in the device management server 1 is the device registered state 32, the device management server 1 transmits the job response to the printer 2. A response when the device management state is the intermediate state 33 will be described later.

If a job to be executed in the printer 2 has been registered in the device management server 1, the job response includes information representing the presence/absence of job data, and if the job data exists, includes location information of the job data. The location information is, for example, the URL of the job data, and is a URL here. If the job data does not exist, the printer 2 transmits the job inquiry in step S41 to the device management server 1 at a predetermined time interval. The presence/absence of job data is confirmed by searching the job table 112 using the device ID as a key. If there is a target unprocessed job, the device management server 1 transmits, to the printer 2, a job response representing the presence of job data. If the job data does not exist, the device management server 1 transmits a notification indicative of this to the printer 2 in step S42, and the process ends.

In step S43, the printer 2 transmits a data request to the device management server 1. In this case, if the above-described job response includes information representing the presence of job data, the printer 2 transmits, to the device management server 1, a data request to a URL indicating the location of the job data. Although the printer 2 transmits the data request to the device management server 1, it is also possible to manage job data in another server and transmit a data request to the other server. The job data is arbitrary as long as the printer 2 can interpret and print the data.

In step S44, the device management server 1 transmits, to the printer 2, a data response including job data represented by the data request. In this case, the printer 2 receives the data response, and executes printing based on the job data included in the data response. This processing is repeated in accordance with job data.

In step S45, the printer 2 transmits a data request to the device management server 1. In this case, the printer 2 transmits a data request for the final job data to the device management server 1. The device management server 1 deletes processed job data. In this case, information representing the completion of processing may be added to the job data to delete the job data upon the lapse of a predetermined period. That is, the job state of a target job in the job table 112 is changed to "completion". The target job data may be deleted from the job table 112 simultaneously when the job state is changed to "completion", or upon the lapse of a predetermined period.

In step S46, the device management server 1 transmits, to the printer 2, a data response including job data represented by the data request. The printer 2 receives and prints the final job data, and then the process returns to the job inquiry in step S41.

Figure 5:
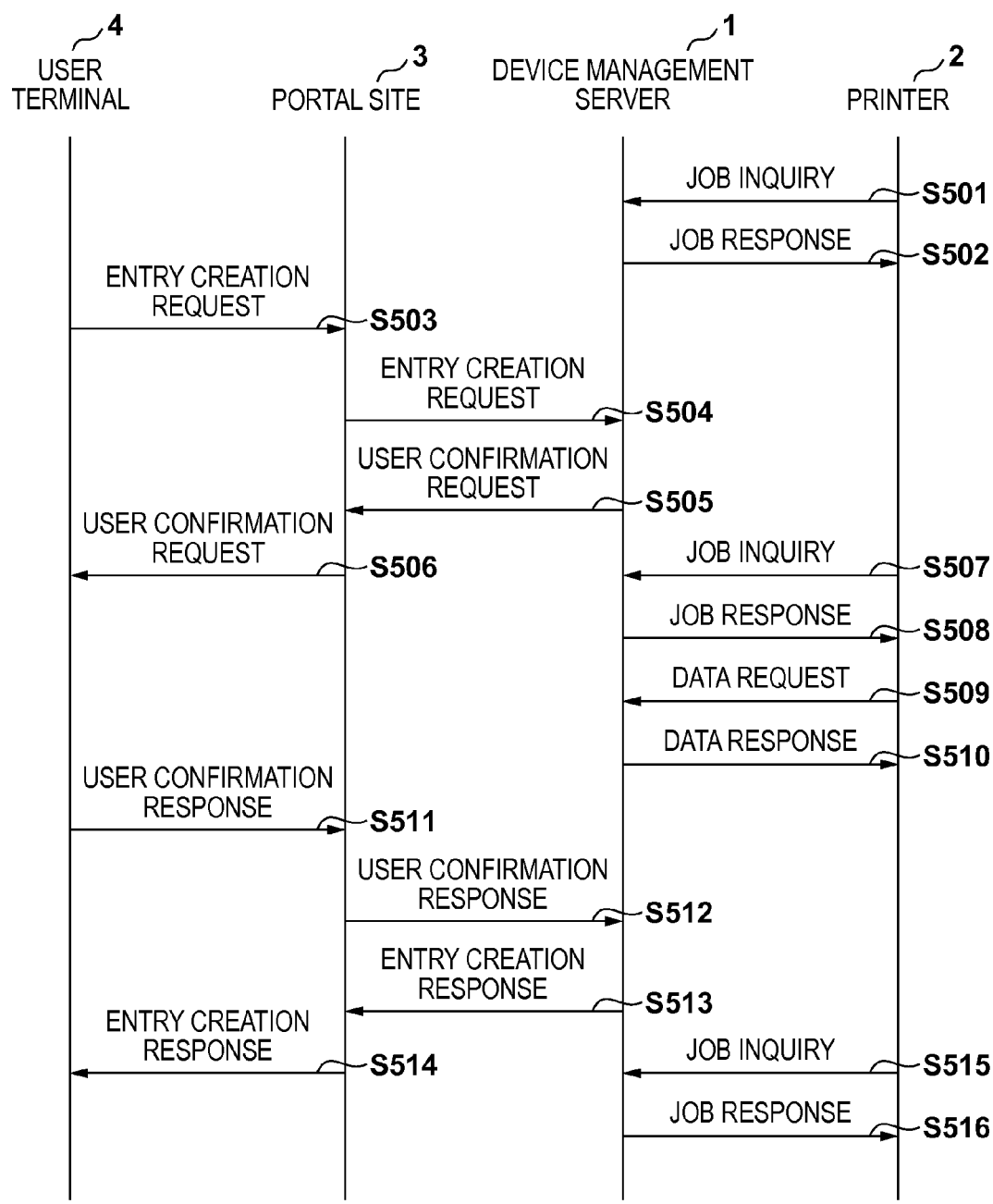
FIG. 5 is a sequence chart when the printer is registered in a portal site.

FIG. 5 is a sequence chart when the printer 2 is registered in the portal site 3. The printer 2 is registered in the portal site 3 so that the printer 2 can be used. This is a procedure to create an entry for performing job registration from the portal site 3 in the device management server 1. Note that programs corresponding to processing shown in the sequence of FIG. 5 are stored in the ROMs of the user terminal 4, portal site 3, device management server 1, and printer 2. The CPUs of the user terminal 4, portal site 3, device management server 1, and printer 2 execute the corresponding programs on the RAMs, thereby implementing the sequence shown in FIG. 5.

In step S501, the printer 2 transmits a job inquiry to the device management server 1. This is the job inquiry sequence shown in FIG. 4.

In step S502, the device management server 1 transmits a job response to the printer 2. This is also the job inquiry sequence shown in FIG. 4. Assume that there is no job.

In step S503, the user terminal 4 transmits an entry creation request to the portal site 3. Assume that the browser of the user terminal 4 displays the HTML content of the portal site 3, and an entry creation request is transmitted to the portal site 3 in accordance with the operation of the displayed HTML content. For example, assume that the device ID "printer_id" of the printer 2 is input to the form of the HTML content and transmitted.

In step S504, the portal site 3 transmits the entry creation request to the device management server 1. In this case, the portal site 3 transmits the entry creation request to the device management server 1 based on the device ID "printer_id" of the printer 2 that has been transmitted from the user terminal 4. The transmission destination is "http://manage.server.com/entry/link.cgi?id=printer_id". Upon receiving the entry creation request from the portal site 3, the device management server 1 generates a user confirmation job for confirming the user of the printer 2. The user confirmation job is, for example, a job to print a number for user confirmation (user confirmation number).

In step S505, the device management server 1 transmits, to the portal site 3, a user confirmation request including the user confirmation job.

Upon receiving the user confirmation request from the device management server 1, the portal site 3 transmits the user confirmation request to the user terminal 4 in step S506. In this case, the portal site 3 generates an HTML content based on a response from the device management server 1, and responds to the user terminal 4. The browser of the user terminal 4 displays the sent-back HTML content. Assume that the HTML content includes a form for inputting a user confirmation number to be printed by a user confirmation job.

In step S507, the printer 2 transmits a job inquiry to the device management server 1. This is the job inquiry sequence shown in FIG. 4.

In step S508, the device management server 1 transmits a job response to the printer 2. This is also the job inquiry sequence shown in FIG. 4. At this time, there is the above-mentioned user confirmation job.

In step S509, the printer 2 transmits a data request to the device management server 1. In this case, the printer 2 requests job data of the user confirmation job.

In step S510, the device management server 1 transmits, to the printer 2, a data response including the job data. In this case, the printer 2 receives and prints job data of the user confirmation job. Then, the user confirmation number is printed, and the user is notified of the user confirmation number. In this case, the user confirmation number is printed by the user confirmation job. However, if the printer 2 includes the display portion, the user confirmation number may be displayed on the display portion.

In step S511, the user terminal 4 transmits a user confirmation response to the portal site 3. In this case, if the user confirmation number printed by the user confirmation job is input to the form of the HTML content displayed in step S506, the user terminal 4 transmits, to the portal site 3, the user confirmation response including the user confirmation number.

In step S512, the portal site 3 transmits the user confirmation response to the device management server 1. In this case, the portal site 3 receives the user confirmation number input to the form, and transmits, to the device management server 1, a user confirmation response including the user confirmation number.

In step S513, the device management server 1 transmits an entry creation response to the portal site 3. In this case, the device management server 1 confirms the received user confirmation number, and if the confirmation is successful, creates an entry and sends back, to the portal site 3, an entry creation response including the entry. More specifically, the device management server 1 newly issues an entry ID (entry_id) and adds an entry to the entry table 111. The URL of an access destination to this entry is, for example, "http://manage.server.com/job/enter.cgi?id=entry_id". The portal site 3 transmits the job registration to this URL. The portal site 3 saves the job registration as user information.

In step S514, the portal site 3 transmits the entry creation response to the user terminal 4. In this case, the portal site 3 generates an HTML content to notify the user that the entry has been created in the device management server 1 and the printer 2 has been registered in the portal site 3. The portal site 3 transmits the HTML content as an entry creation response to the user terminal 4. The browser of the user terminal 4 displays the HTML content.

In step S515, the printer 2 transmits a job inquiry to the device management server 1. This is the job inquiry sequence shown in FIG. 4.

In step S516, the device management server 1 transmits a job response to the printer 2. This is also the job inquiry sequence shown in FIG. 4.

Figure 6:
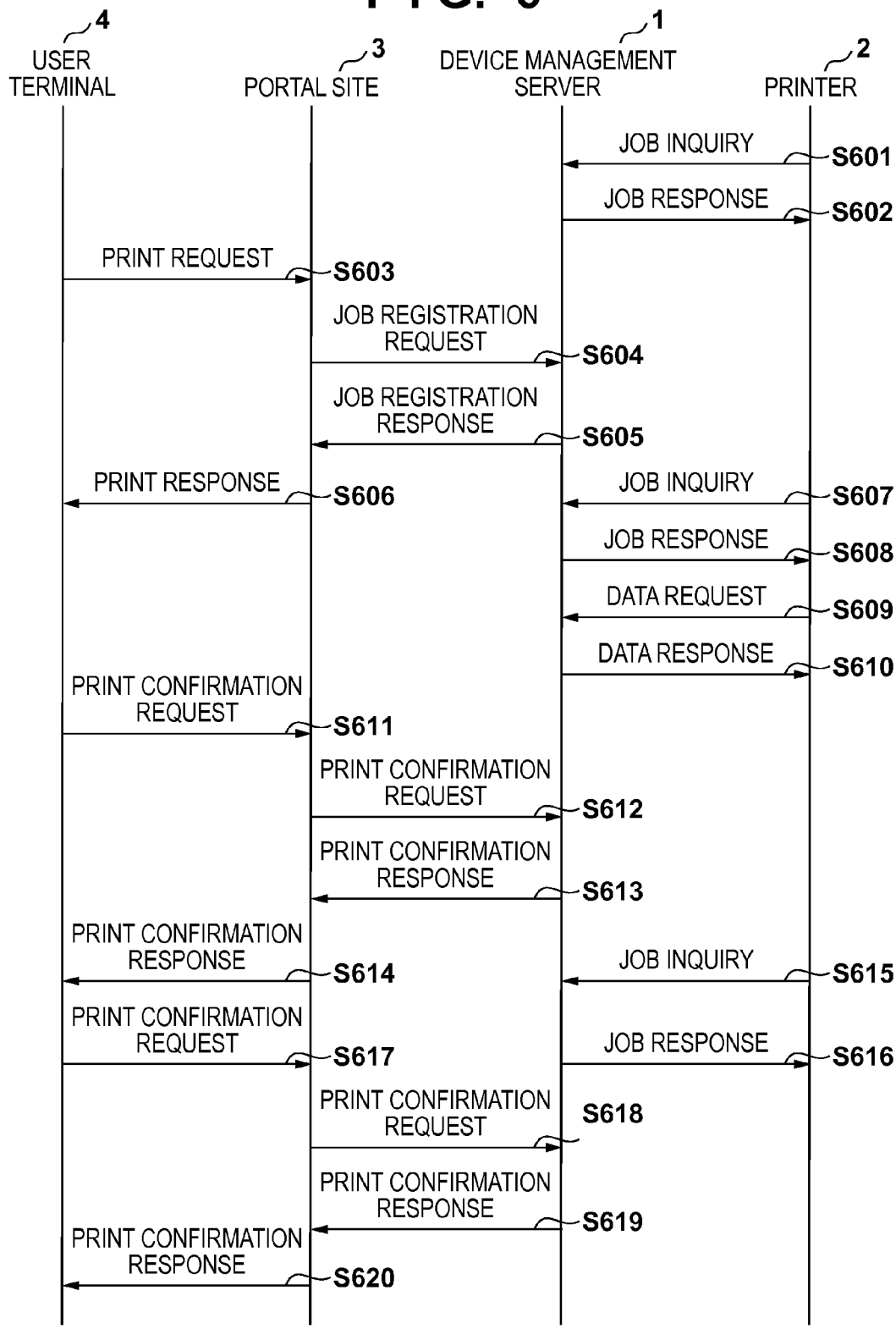
FIG. 6 is a sequence chart when printing is performed from the portal site in a device registered state.

FIG. 6 is a sequence chart when printing is performed from the portal site 3 in the device registered state 32. Note that programs corresponding to processing shown in the sequence of FIG. 6 are stored in the ROMs of the user terminal 4, portal site 3, device management server 1, and printer 2. The CPUs of the user terminal 4, portal site 3, device management server 1, and printer 2 execute the corresponding programs on the RAMs, thereby implementing the sequence shown in FIG. 6.

In step S601, the printer 2 transmits a job inquiry to the device management server 1. This is the job inquiry sequence shown in FIG. 4.

In step S602, the device management server 1 transmits a job response to the printer 2. This is also the job inquiry sequence shown in FIG. 4.

In step S603, the user terminal 4 transmits a print request to the portal site 3. Assume that user authentication has been performed in the portal site 3. For example, assume that user information is input to the user terminal 4 and matches user information saved in the portal site 3 in step S513 of FIG. 5 by collation processing of the portal site 3. In this state, the user terminal 4 can transmit a print request to the printer 2.

In step S603, the user terminal 4 transmits a print request to the portal site 3 by the browser operation of the user terminal 4 that displays the HTML content of the portal site 3.

In step S604, the portal site 3 transmits a job registration request to the device management server 1 in accordance with an entry corresponding to the user information. In this case, the portal site 3 transmits the job registration request to the device management server 1 by transmitting job data to the above-mentioned access destination URL "http://manage.server.com/job/enter.cgi?id=entry_id" to the entry by using the POST method. The job data transmitted from the portal site 3 is saved as a resource of the device management server 1 and registered in the job table 112. The printer 2 can access the job data at the URL "http://manage.server.com/job/data.cgi?id=job_id". "job_id" is a job ID that assigns a unique number to an individual job in order to identify the individual job at the time of registration in the job table 112.

In step S605, the device management server 1 transmits a job registration response to the portal site 3. In this case, the device management server 1 performs job registration, and transmits, to the portal site 3, a job registration response representing the completion of the job registration in the portal site 3. Subsequently, a job response representing that job data exists is sent back in response to a job inquiry from the printer 2. Assume that this job response includes the above-mentioned URL "http://manage.server.com/job/data.cgi?id=job_id" as location information of the job data.

In step S606, the portal site 3 transmits a print response to the user terminal 4. In this case, the portal site 3 generates an HTML content, and transmits, to the user terminal 4, the print response to notify the user that the registration of the job has been completed.

In step S607, the printer 2 transmits a job inquiry to the device management server 1.

In step S608, the device management server 1 transmits a job response to the printer 2. In this case, the device management server 1 transmits, to the printer 2, a job response representing that job data exists, as described above.

In step S609, the printer 2 transmits a data request to the device management server 1. In this case, the printer 2 transmits, to the device management server 1, a data request to data indicated by the location information of the job data included in the response from the device management server 1.

In step S610, the device management server 1 transmits, to the printer 2, a data response including the job data. In this case, the printer 2 executes printing based on the job data received from the device management server 1.

In step S611, the user terminal 4 transmits a print confirmation request to the portal site 3. In this case, the user terminal 4 transmits a print confirmation request to the portal site 3 by the browser operation of the user terminal 4 that displays the HTML content of the portal site.

In step S612, the portal site 3 transmits the print confirmation request to the device management server 1. In this case, the portal site 3 accesses the above-mentioned access destination URL "http://manage.server.com/job/enter.cgi?id=entry_id" to the entry, and confirms the job state.

In step S613, the device management server 1 transmits a print confirmation response to the portal site 3. In this case, the device management server 1 sends back the job state of the job data in accordance with status information from the printer 2. Assume that the device management server 1 sends back a status "during printing" to the portal site 3 in a state in which no print completion notification has been received from the printer 2.

In step S614, the portal site 3 transmits the print confirmation response to the user terminal 4. In this case, the portal site 3 generates an HTML content corresponding to the print confirmation response from the device management server 1, and transmits it as the print confirmation response to the user terminal 4.

In step S615, the printer 2 transmits a job inquiry to the device management server 1. Assume that the job inquiry includes the job state "completion".

In step S616, the device management server 1 transmits a job response to the printer 2.

In step S617, the user terminal 4 transmits a print confirmation request to the portal site 3.

In step S618, the portal site 3 transmits the print confirmation request to the device management server 1. As in the sequence from step S611, a job state is inquired.

In step S619, the device management server 1 transmits a print confirmation response to the portal site 3. Since the device management server 1 has been notified of the job state "completion" from the printer 2, it transmits, to the portal site 3, a print confirmation response including the job state "completion".

In step S620, the portal site 3 transmits the print confirmation response to the user terminal 4. In this case, the portal site 3 generates an HTML content corresponding to the print confirmation response from the device management server 1, and transmits it as the print confirmation response to the user terminal 4. From this, the user knows the completion of printing.

Figure 7:
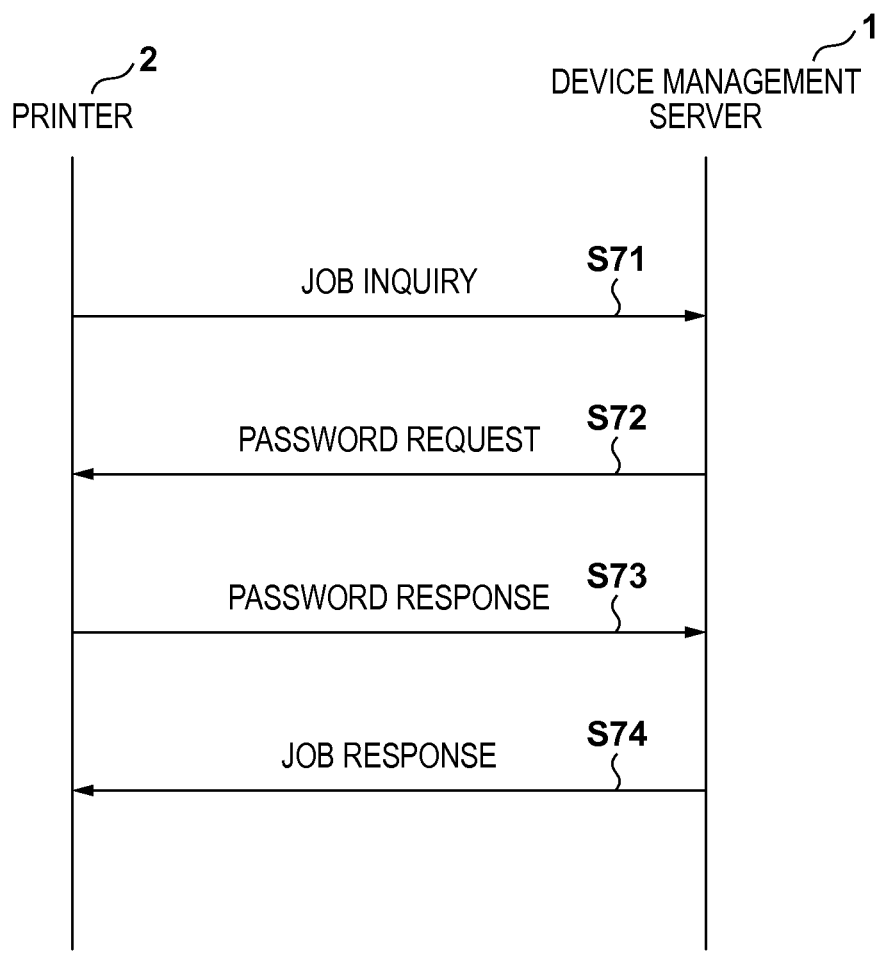
FIG. 7 is a sequence chart when device management processing in the device management server shifts to the intermediate state.

FIG. 7 is a sequence chart when device management processing in the device management server 1 shifts to the intermediate state 33. As described above, the processing shifts to the intermediate state 33 when no job inquiry from the printer 2 has been received in more than a predetermined period. It is considered that no job inquiry has been received in more than the predetermined period because the printer 2 is highly likely to have been moved for any reason. Note that programs corresponding to processing shown in the sequence of FIG. 7 are stored in the ROMs of the printer 2 and device management server 1. The CPUs of the printer 2 and device management server 1 execute the corresponding programs on the RAMs, thereby implementing the sequence shown in FIG. 7.

In step S71, the printer 2 transmits a job inquiry to the device management server 1. This is the first job inquiry after, for example, the printer 2 changes from the power-off state to the power-on state.

In step S72, the device management server 1 transmits a password request to the printer 2. In this case, device management processing to the printer 2 has shifted to the intermediate state 33, so the device management server 1 sends back a password request for user confirmation. Upon receiving the password request, the printer 2 displays a message indicative of this and prompts the user to input a password.

In step S73, the printer 2 transmits a password response to the device management server 1. In this case, the printer 2 transmits, to the device management server 1, a password response including the password input from the user.

In step S74, the device management server 1 transmits a job response to the printer 2. In this case, the device management server 1 searches the device table 110, and collates the password included in the password response with a set password. If the passwords coincide with each other, the device management server 1 returns the device management processing state of the printer 2 to the device registered state 32, and transmits a job response to the printer 2. If the passwords do not coincide with each other, the device management server 1 maintains the intermediate state 33, and transmits a password error response to the printer 2, instead of a job response.

If password mismatches occur more than a specified number of times for job inquiries and password requests, or if the intermediate state 33 continues for a predetermined period or more, the device management processing state of the printer 2 in the device management server 1 shifts to the device unregistered state 31. The device management server 1 then cancels the device registration of the printer 2. Along with this, the entry created for the printer 2 is also deleted, and the printer 2 cannot be used from the portal site 3 anymore. That is, the same processing as that in step S27 of FIG. 2 is performed.

Figure 8:
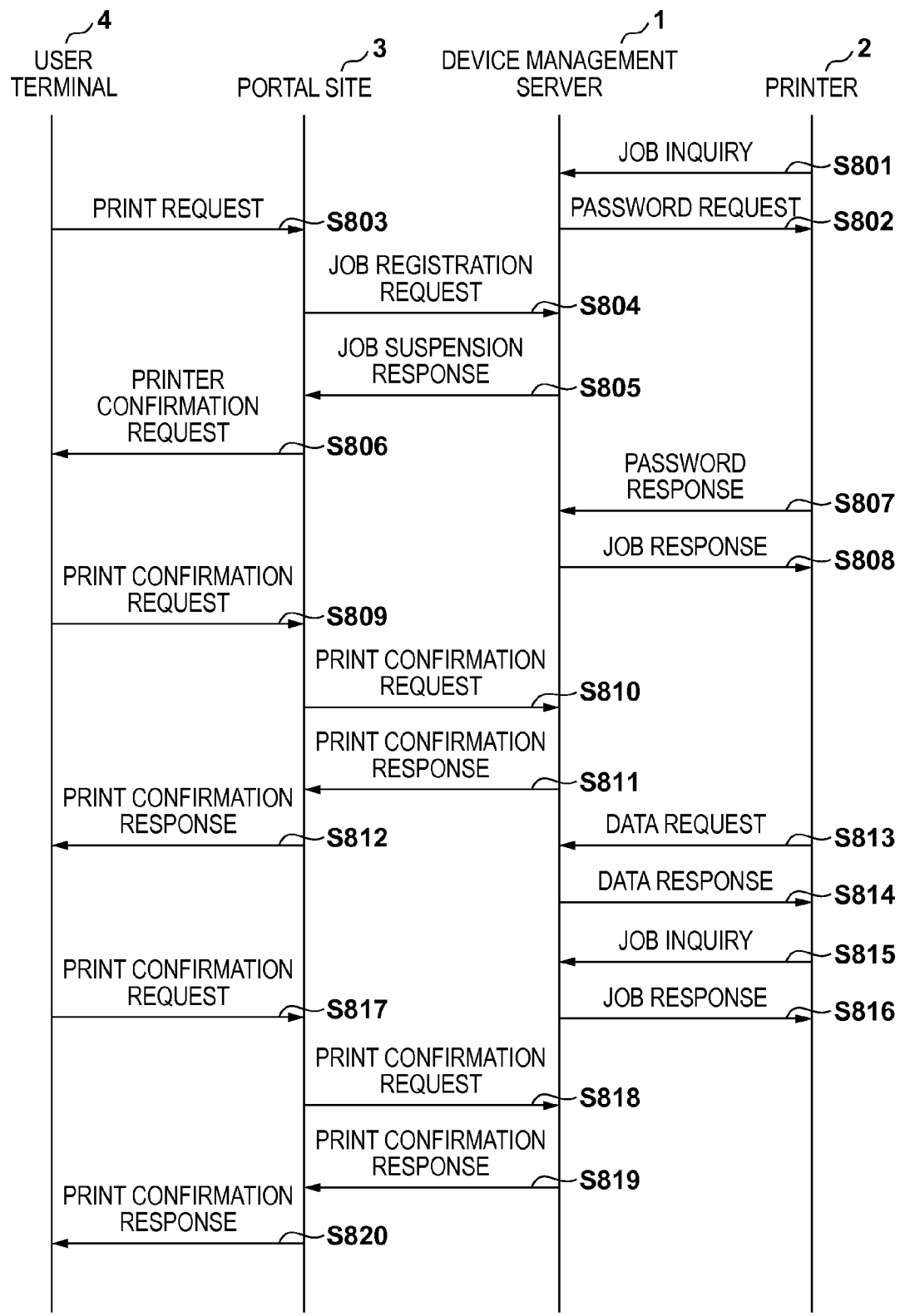
FIG. 8 is a sequence chart when printing is performed from the portal site in the intermediate state.

FIG. 8 is a sequence chart when printing is performed from the portal site 3 in the intermediate state 33. Note that programs corresponding to processing shown in the sequence of FIG. 8 are stored in the ROMs of the user terminal 4, portal site 3, device management server 1, and printer 2. The CPUs of the user terminal 4, portal site 3, device management server 1, and printer 2 execute the corresponding programs on the RAMs, thereby implementing the sequence shown in FIG. 8.

In step S801, the printer 2 transmits a job inquiry to the device management server 1. This is the job inquiry sequence shown in FIG. 4.

In step S802, the device management server 1 transmits a password request to the printer 2. As shown in FIG. 7, when device management processing of the printer 2 in the device management server 1 is in the intermediate state 33, the device management server 1 sends a password request as a response to the printer 2.

In step S803, the user terminal 4 transmits a print request to the portal site 3.

In step S804, the portal site 3 transmits a job registration request to the device management server 1. This is the same as the print request shown in FIG. 6.

In step S805, the device management server 1 transmits a job suspension response to the portal site 3. In this case, the job registration is suspended because device management processing of the printer 2 in the device management server 1 is in the intermediate state 33. That is, the job state of a job to be registered in the job table 112 is suspended. Assume that when the device management processing shifts to the device unregistered state 31 while the job state is suspended, the suspended job is deleted.

In step S806, the portal site 3 transmits a printer confirmation request to the user terminal 4. In this case, the portal site 3 generates an HTML content in accordance with the job suspension response, and transmits, to the user terminal 4, a printer confirmation request notifying to confirm the printer 2.

In step S807, the printer 2 transmits a password response to the device management server 1. In this case, the user inputs a password to the printer 2 in accordance with the password response, and the printer 2 transmits, to the device management server 1, a password response including the input password.

In step S808, the device management server 1 transmits a job response to the printer 2. In this case, the device management server 1 searches the device table 110, and compares the password included in the password response with a set password. If the passwords coincide with each other, the device management server 1 shifts the device management processing state of the printer 2 to the device registered state 32. The suspended job is registered, and the device management server 1 transmits a job response to the printer 2.

In step S809, the user terminal 4 transmits a print confirmation request to the portal site 3. In this case, the printer 2 transmits the print confirmation request to the portal site 3 by the browser operation of the user terminal 4 by the user who has input the password to the printer 2.

In step S810, the portal site 3 transmits the print confirmation request to the device management server 1.

In step S811, the device management server 1 transmits a print confirmation response to the portal site 3. In this case, the device management server 1 transmits, to the portal site 3, the print confirmation response representing that the suspended job has been registered.

In step S812, the portal site 3 transmits the print confirmation response to the user terminal 4. In this case, the portal site 3 generates an HTML content in accordance with the print confirmation response from the device management server 1, and transmits, to the user terminal, the print confirmation response notifying that the job has been registered.

In step S813, the printer 2 transmits a data request to the device management server 1.

In step S814, the device management server 1 transmits, to the printer 2, a data response including job data. In this case, the printer 2 executes printing based on the job data received from the device management server 1.

In step S815, the printer 2 transmits a job inquiry to the device management server 1. In this case, the printer 2 transmits, to the device management server 1, a job inquiry including the job state "completion".

In step S816, the device management server 1 transmits a job response to the printer 2. In this case, the job has been processed, so the device management server 1 transmits, to the printer 2, a job response representing that no job exists.

In step S817, the user terminal 4 transmits a print confirmation request to the portal site 3.

In step S818, the portal site 3 transmits the print confirmation request to the device management server 1. As in the above-described case, the portal site 3 transmits the print confirmation request to the device management server 1.

In step S819, the device management server 1 transmits a print confirmation response to the portal site 3. Since the device management server 1 has been notified of the job state "completion" from the printer 2, it transmits, to the portal site 3, a print confirmation response including the job state "completion".

In step S820, the portal site 3 transmits the print confirmation response to the user terminal 4. In this case, the portal site 3 generates an HTML content corresponding to the print confirmation response from the device management server 1, and transmits it as the print confirmation response to the user terminal 4.

When there are a plurality of portal sites, it suffices to create entries for the respective portal sites. That is, individual entry IDs are issued for the respective portal sites and added to the entry table.

As described above, according to the first embodiment, the linkage relationship between an owner and a device ID is managed in accordance with a predetermined condition. When the relationship between the owner and the device has changed, a measure appropriately reflecting the relationship becomes possible even without an explicit measure. For example, when no owner information is input, the target device identification information is invalidated. When the target owner information is input or when the state of the device does not satisfy a predetermined condition, it is controlled so that the device can execute a job in accordance with stored device identification information.

More specifically, for example, when the printer is turned off, it shifts to the intermediate state 33. In the intermediate state 33, the device ID is deleted unless a password registered in the device management server is input. When the printer is transferred, the device ID can be properly invalidated to prevent printing of a print job by a previous owner despite the intention of a new owner. When, for example, the printer has been merely moved and the owner remains unchanged, the printer can shift to the device registered state by inputting a password in the intermediate state 33. The printer can therefore shift to the device registered state without performing again printer registration processing.

Also, unnecessary management information can be automatically deleted to effectively use the resource of the device management server. Further, a measure corresponding to the relationship between the owner and the device becomes possible even for the account of a network service linked to the device ID.

<Second Embodiment>

FIG. 9 is a block diagram showing a device management system according to the second embodiment. This device management system is constituted by adding an external user terminal 5 to the arrangement of FIG. 1. The external user terminal 5 is a user terminal used by an external user different from the owner of a printer 2, and is a terminal device for accessing a portal site 3.

In order to enable the use of the printer 2 from the external user terminal 5, the printer 2 is registered in the account of the external user for the portal site 3. To do this, an entry for the external user is created in a device management server 1. The creation procedure complies with the sequence shown in FIG. 5 in the first embodiment. Assume that the owner of the printer 2 creates an entry. The external user terminal 5 is notified of the created entry so that the printer 2 can be used from the external user terminal 5. By registering a job in this entry, the external user terminal 5 can transmit the job to the owner of the printer 2.

The device management server 1 may distinctively manage an entry for the external user and an entry for the owner of the printer 2. For example, in the first embodiment, when printing is performed in an intermediate state 33, which has been explained with reference to FIG. 8 in the first embodiment, not a suspension response but a rejection response may be sent with respect to job registration from the external user. The entry for the external user may also be deleted by an operation from the printer 2. To distinctively manage the external user, column data is added to an entry table so that the external user can be identified.

As described above, according to the second embodiment, an external user different from the owner of the printer 2 can be permitted to adaptively, properly use the device, as needed, in addition to the effects described in the first embodiment.

<Third Embodiment>

The above-described embodiments have explained a device management system (information processing system)

regarding the printer 2 as a device, but the present invention is not limited to this. For example, the present invention is applicable to even a device capable of providing various services via a network, such as an image reading apparatus, a display apparatus, or a composite apparatus having functions such as a scanner function, a copy function, a print function, and a facsimile function, instead of the printer 2.

The display portion of the printer 2 displays a screen for prompting input of a password in the intermediate state 33 in the above-described embodiments, but the present invention is not limited to this. For example, the screen may be displayed on a display apparatus arranged in or connected to an arbitrary one of various apparatuses (for example, the user terminal 4 and PC) that has transmitted user information to the portal site 3.

The above-described embodiment has exemplified ON/OFF of the power supply of the printer 2 as an example of a predetermined condition (condition to shift to the intermediate state) to estimate that the owner of the printer 2 has changed. As for the "power supply", for example, when the printer 2 receives power from an AC power supply, the ON/OFF operation of the AC power supply may be adopted as the predetermined condition. In this case, power-off/on (so-called soft-off/soft-on) by pressing the power supply button of the printer 2 in a state in which power is supplied from the AC power supply may be excluded from the predetermined condition.

It is often the case that the AC power supply is turned off and on when the owner changes. Even for the same owner, soft-off and soft-on are frequently performed in many cases. Thus, by setting the power-off/on of the AC power supply as the predetermined condition, as described above, input of a password can be appropriately requested when the owner has changed. It may be configured not to request input of a password at the time of soft-off and soft-on. This can prevent frequent request of input of a password though the owner remains unchanged.

As the predetermined condition (condition to shift to the intermediate state) to estimate that the owner of the printer 2 has changed, for example, a change of the network environment of the printer 2 may be used. For example, when the device management server 1 recognizes that the global IP address of the printer 2 has changed, the printer 2 may shift to the intermediate state on the assumption that the owner is likely to have changed. Alternatively, when a provider that allows the printer 2 to access the device management server 1 has changed, the printer 2 may shift to the intermediate state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-000649, filed Jan. 6, 2014, which is hereby incorporated by reference wherein in its entirety.

What is claimed is:

1. An information processing apparatus that manages a device configured to execute a job requested from a client on a network, the information processing apparatus comprising:
    a storage unit configured to store, in association with each other, (1) device identification information for identifying the device and (2) owner information for specifying an owner of the device;
    a registration unit configured to manage, in a case where a registration request for a device to be managed is received, the device to be managed as being in a device registered state by registering in the storage unit, in association with each other, (a) user information received from the device to be managed and (b) device identification information of the device to be managed;
    a deregistration unit configured (a) to perform, in a case where a deregistration request for a device in the device registered state is received, a matching process between user information received from the device in the device registered state and user information of a respective device stored in the storage unit, and (b) to perform a deregistration process for deregistration of the device in the device registered state, if the user information received from the device in the device registered state and the user information of the respective device stored in the storage unit match in the matching process; and
    a management unit configured to change, in a case where a state of the device in the device registered state satisfies a predetermined condition, the state of the device to an intermediate state,
    wherein the deregistration unit is further configured to perform the deregistration process, in a case where a deregistration request for a device in the intermediate state is received, for the device in the intermediate state without performing the matching process regarding user information of the device in the intermediate state.

2. An information processing method of managing a device configured to execute a job requested from a client on a network, the information processing method comprising:
    a storage step of storing, in a storage medium, in association with each other, (1) device identification information for identifying the device and (2) owner information for specifying an owner of the device;
    a registration step of registering, in a case where a registration request for a device to be managed is received, the device to be managed as being in a device registered state by registering in the storage medium, in association with each other, (a) user information received from the device to be managed and (b) device identification information of the device to be managed;

a deregistration step of (a) performing, in a case where a deregistration request for a device in the device registered state is received, a matching process between user information received from the device in the device registered state and user information of a respective device stored in the storage medium, and (b) performing a deregistration process for deregistration of the device in the device registered state, if the user information received from the device in the device registered state and the user information of the respective device stored in the storage medium match in the matching process; and a management step of changing, in a case where a state of the device in the device registered state satisfies a predetermined condition, the state of the device to an intermediate state, wherein the deregistration step further includes performing the deregistration process, in a case where a deregistration request for a device in the intermediate state is received, for the device in the intermediate state without performing the matching process regarding user information of the device in the intermediate state.

3. A non-transitory computer-readable storage medium storing a program for causing a computer to function as an information processing apparatus that manages a device configured to execute a job requested from a client on a network, the information processing apparatus comprising:

a storage unit configured to store, in association with each other, (1) device identification information for identifying the device and (2) owner information for specifying an owner of the device;

a registration unit configured to manage, in a case where a registration request for a device to be managed is received, the device to be managed as being in a device registered state by registering in the storage unit, in association with each other, (a) user information received from the device to be managed and (b) device identification information of the device to be managed;

a deregistration unit configured (a) to perform, in a case where a deregistration request for a device in the device registered state is received, a matching process between user information received from the device in the device registered state and user information of a respective device stored in the storage unit, and (b) to perform a deregistration process for deregistration of the device in the device registered state, if the user information received from the device in the device registered state and the user information of the respective device stored in the storage unit match in the matching process; and a management unit configured to change, in a case where a state of the device in the device registered state satisfies a predetermined condition, the state of the device to an intermediate state, wherein the deregistration unit is further configured to perform the deregistration process, in a case where a deregistration request for a device in the intermediate state is received, for the device in the intermediate state without performing the matching process regarding user information of the device in the intermediate state.

4. The information processing apparatus according to claim 1, wherein the predetermined condition is that a time elapsed from when information is last received from the device in the device registered state is greater than a predetermined threshold value.

5. The information processing apparatus according to claim 1, wherein the predetermined condition is that information indicating that power has turned ON is received from the device in the device registered state.

6. The information processing apparatus according to claim 1, wherein the registration unit is further configured (a) to perform a matching process between the user information received from the device in the intermediate state and the user information of the respective device stored in the storage unit, and (b) to change the state of the device to the device registered state if the user information received from the device in the intermediate state and the user information of the respective device stored in the storage unit match in the matching process.

7. The information processing apparatus according to claim 5, wherein the registration unit is further configured (a) to request, in a case where the information indicating that power has turned ON is received from the device in the intermediate state, user information from the device in the intermediate state, (b) to perform a matching process between user information received in response to the request and the user information of the respective device stored in the storage unit, and (c) to restore the state of the device to the device registered state if the user information received in response to the request and the user information of the respective device stored in the storage unit match in the matching process.

8. The information processing apparatus according to claim 1, further comprising a send unit configured to send, in a case where a job is received from the client of a user on the network, the received job to a device associated with user information for specifying the user only if the device is in the device registered state.

9. The information processing apparatus according to claim 1, wherein the registration request is received from a device to be managed.

10. The information processing apparatus according to claim 1, wherein the deregistration request is received from a device in the device registered state or the intermediate state.

11. The information processing apparatus according to claim 1, wherein the deregistration unit deletes information relating to the device in the device registered state or the intermediate state, as the deregistration process.

12. The information processing method according to claim 2, wherein the device to be managed is a printer.

13. The information processing method according to claim 2, wherein the predetermined condition is that a time elapsed from when information is last received from the device in the device registered state is greater than a predetermined threshold value.

14. The information processing method according to claim 2, wherein the predetermined condition is that information indicating that power has turned ON is received from the device in the device registered state.

15. The information processing method according to claim 2, wherein the registration step includes (a) performing a matching process between the user information received from the device in the intermediate state and the user information of the respective device stored in the storage medium, and (b) changing the state of the device to the device registered state if the user information received from the device in the intermediate state and the user information of the respective device stored in the storage medium match in the matching process.

16. The information processing method according to claim 14, wherein the registration step includes (a) requesting, in a case where the information indicating that power has turned ON is received from the device in the intermediate state, user information from the device in the intermediate state, (b) performing a matching process between user information received in response to the request and the user information of the respective device stored in the storage medium, and (c) restoring the state of the device to the device registered state if the user information received in response to the request and the user information of the respective device stored in the storage medium match in the matching process.

17. The information processing method according to claim 2, further comprising a sending step of sending, in a case where a job is received from the client of a user on the network, the received job to a device associated with user information for specifying the user only if the device is in the device registered state.

18. The information processing method according to claim 2, wherein the registration request is received from a device to be managed.

19. The information processing method according to claim 2, wherein the deregistration request is received from a device in the device registered state or the intermediate state.

20. The information processing method according to claim 2, wherein the deregistration step includes deleting information relating to the device in the device registered state or the intermediate state, as the deregistration process.

* * * * *